United States Patent
Leon et al.

[11] Patent Number: 6,134,949
[45] Date of Patent: *Oct. 24, 2000

[54] METHOD AND APPARATUS FOR ON-LINE DETECTION OF LEAKY EMERGENCY SHUT DOWN OR OTHER VALVES

[75] Inventors: Robert L. Leon, Maple Glen; David Q. Heagerty, Glen Mills, both of Pa.

[73] Assignee: Crane Nuclear, Inc., Kennesaw, Ga.

[*] Notice: This patent issued on a continued prosecution application filed under 37 CFR 1.53(d), and is subject to the twenty year patent term provisions of 35 U.S.C. 154(a)(2).

[21] Appl. No.: 09/337,121

[22] Filed: Jun. 21, 1999

Related U.S. Application Data

[62] Division of application No. 09/096,955, Jun. 12, 1998.
[60] Provisional application No. 60/055,728, Jun. 26, 1997, and provisional application No. 60/060,590, Oct. 1, 1997.

[51] Int. Cl.$^7$ ................................................. G01M 3/28
[52] U.S. Cl. ............................................. 73/40.5 A; 73/46
[58] Field of Search ........................... 73/40.5 A, 40.5 R, 73/46

[56] References Cited

U.S. PATENT DOCUMENTS

| | | | |
|---|---|---|---|
| 4,821,769 | 4/1989 | Mills et al. | 137/554 |

FOREIGN PATENT DOCUMENTS

| | | | |
|---|---|---|---|
| 0066128 | 4/1985 | Japan | 73/40.5 A |
| 0311242 | 12/1989 | Japan | 73/40.5 A |
| 0059637 | 2/1990 | Japan | 73/40.5 A |
| 406323945 | 11/1994 | Japan | 73/40.5 A |

Primary Examiner—Michael Brock
Attorney, Agent, or Firm—Womble Carlyle Sandridge & Rice

[57] ABSTRACT

A method and apparatus for on-line detection of leaky emergency shutdown or other valves in a fluid transport system having an upstream pipe, a downstream pipe and the valve connected between the upstream pipe and the downstream pipe for controlling fluid flow through the system. The valve has at least one upstream seal and at least one downstream seal and an inner cavity effectively isolated by the seals from the fluid flow stream through the system. The apparatus comprises a first transducer in fluid communication with the fluid flow stream at at least one of: a predetermined distance upstream of the upstream seal; and a predetermined distance downstream of the downstream seal. The first transducer is for sensing pressure pulsations resulting from at least one of: dynamic energy due to fluid flow through the transport system; and transient energy within the fluid in the transport system after the valve is closed and for generating representative electrical signals as a function of time. A second transducer is in fluid communication with the inner cavity of the valve for sensing substantially simultaneous pressure pulsations within the inner cavity and for generating second representative electrical signals as a function of time. An analyzer receives the first and second electrical signals and generates at least one of: a frequency response function; and a coherence function. The generated function is sufficiently averaged to provide a meaningful measure of the degree to which the two electrical signals are related to thereby indicate whether, and to what extent, sensed pressure pulsations within the fluid transport system are passed through at least one of the seals to the inner cavity.

10 Claims, 10 Drawing Sheets

METHOD AND APPARATUS FOR ON-LINE DETECTION OF LEAKY EMERGENCY SHUT DOWN OR OTHER VALVES

CROSS REFERENCE TO RELATED APPLICATIONS

This application is a division of U.S. application Ser. No. 09/096,955, filed Jun. 12, 1998.

This application claims priority from Provisional Application No. 60/055,728 filed Jun. 26, 1997 and Provisional Application No. 60/060,590 filed Oct. 1, 1997.

BACKGROUND OF THE INVENTION

The present invention generally relates to the leak testing of Emergency Shut Down valves, more commonly known as ESD valves. ESD valves are in use in many commercial and industrial facilities and, in particular, are used on all or virtually all of the approximately 2,000 off-shore oil and gas platforms around the world to isolate the platform in the event of an emergency. The purpose of the present invention is to provide a means for more easily determining, on-line, whether an individual ESD valve on such a platform or in any other location or application might leak if called upon to close in an emergency or other situation, and thus might fail to perform its intended isolation or other function. The need to verify the integrity of ESD valves has been made more apparent by the Piper Alpha disaster in the British sector of the North Sea, which led to the sinking of a platform and a significant loss of life in the late 1980's.

There are many different types of valves on each off-shore platform, and more than ten such valves are ESD valves. The ESD valves are typically placed in a closed position or condition only during normal or other production shutdowns, as well as during emergencies. The majority of the ESD valves are ball valves, while most of the remainder of the ESD valves are gate valves. On the platform, the ESD valves are usually situated in-line or in series with other valves that are also closed off in emergency shutdown and production shutdown situations. However, the ESD valve is considered to be the valve of last resort, the valve that must perform and must provide isolation should all of the other in-line valves fail to close or fail to fully close or to otherwise leak. Since the other upstream, in-line valves usually do properly close and do not usually leak, and because in an emergency shutdown or production shutdown situation, many of the other, in-line valves close before the ESD valve closes, there is often no differential pressure applied across the ESD valve which could produce a detectable leak. Thus, in emergency or production shutdown situations, commonly used methods for detecting leaks in valves such as high frequency acoustic leak detection cannot be used in most cases to identify a leaky ESD valve, and certainly cannot be used to identify a partially leaky ESD valve. A partially leaky ESD valve is defined herein as an ESD valve in which at least one, but not all, of the internal seals is leaky. Usually the other seals, will prevent a partially leaky ESD valve from leaking, but it is still important to be able to detect a partially leaky ESD valve because such an ESD valve could become a fully leaky ESD valve in the next or some future closure attempt, and it would be wise to repair any such ESD valve at the first available opportunity to prevent a possible leaky situation in the future.

Presently on off-shore platforms, in order to identify leaky or partially leaky ESD valves, platform operators sometime resort to pressurizing the inner cavity of each ESD valve with nitrogen to see if the ESD valve can hold the pressure. This is usually accomplished during costly (up to $300,000 per hour) production shutdowns. It would certainly be better if a method and apparatus could be devised to identify leaky and partially leaky ESD and other valves on-line during production, or during planned and unplanned shutdowns, using equipment and techniques that don't involve costly and time consuming additional steps such as injecting high pressure nitrogen.

The present invention provides a method and apparatus for on-line detection of leaky and partially leaky ESD and other valves during actual production as well as during a shutdown, and without employing additional steps such as the injection of nitrogen gas. The method and apparatus of the present invention can be used on the majority of ESD valves that are installed on off-shore platforms during actual production, enabling for the first time, leaky and partially leaky ESD and other valves to be identified periodically and/or continuously without any loss of production or associated costs. For all ESD valves, including the remainder that can not be identified during production, the present invention can be employed following a shutdown, either a planned or an unplanned shutdown. And as indicated before, no additional steps are required.

The present invention involves the analysis of simultaneous dynamic signals from one pressure transducer located in the cavity of the ESD or other valve and another pressure transducer located upstream or downstream from the valve. On most platforms, appropriate pressure taps are already in place on the ESD valves and on the valve piping. The inventive principles, as hereinafter described, are based on combining an understanding of the design of ESD valves, with an understanding of the physical principles involved in the flow of fluids through pipes and the transients that occur in the cessation of such flow, with an understanding of how sound travels in fluid filled pipes, and finally with an understanding of the processing of dynamic signals.

BRIEF SUMMARY OF THE INVENTION

Briefly stated, the present invention comprises a method and apparatus for on-line detection of leaky emergency shutdown or other valves. The apparatus is for use with a fluid transport system having an upstream pipe, a downstream pipe and a valve connected between the upstream pipe and the downstream pipe for controlling fluid flow through the system. The valve has at least one upstream seal, at least one downstream seal and an inner cavity effectively isolated by the seals from the fluid flow stream. The apparatus for detecting a leak in at least one of the seals comprises a first transducer in fluid communication with the fluid flow stream at at least one of: a predetermined distance upstream of the upstream seal; and, a predetermined distance downstream of the downstream seal. The first transducer is for sensing pressure pulsations resulting from at least one of: dynamic energy due to fluid flow through the fluid transport system; and, transient energy within the fluid in the transport system after the valve is closed and for generating representative electrical signals as a function of time. A second transducer is in fluid communication with the inner cavity for sensing substantially simultaneous pressure pulsations within the inner cavity and for generating second representative electrical signals as a function of time. An analyzer is provided for receiving the first and second electrical signals and for generating at least one of a frequency response function, and a coherence function. The generated function is sufficiently averaged to provide a meaningful measure of the degree to which the two electrical signals are related to thereby indicate whether, and to what extent, sensed pressure pulsations within the fluid transport system are passed through at least one of the seals to the inner cavity.

In one embodiment, the apparatus is employed for detecting and identifying the location of a leak in at least one of the seals when the valve is closed. In this embodiment, an external sound source is in fluid communication with the fluid transport system for generating sound energy within the system. The first and second transducers are for sensing pressure pulsations resulting from acoustic energy generated by the sound source.

Another embodiment involves a method for use with a fluid transport system having an upstream pipe, a downstream pipe and a valve connected between the upstream pipe and the downstream pipe for controlling fluid flow within the system. The valve has at least one upstream seal, at least one downstream seal and an inner cavity effectively isolated by the seals from the fluid flow stream. The method is for detecting the presence of a leak in both of the seals when the valve is closed and a differential pressure exists across the valve. The steps of the method comprise: determining the magnitude of the differential pressure across the valve; sensing the presence of pressure pulsations within the inner cavity resulting from fluid flowing through the seals into and out of the inner cavity and generating representative electrical signals as a function of time; analyzing the electrical signals and generating an auto spectrum representation; and using the auto spectrum representation in conjunction with the determined differential pressure magnitude to indicate the existence and extent of a leak.

BRIEF DESCRIPTION OF THE DRAWINGS

The foregoing summary, as well as the following detailed description of a preferred embodiment of the invention, will be better understood when read in conjunction with the appended drawings. For the purpose of illustrating the invention, there is shown in the drawings particular arrangements and methodologies. It should be understood, however, that the invention is not limited to the precise arrangements shown, or methodologies of the detailed description. In the drawings.

DETAILED DESCRIPTION OF THE INVENTION

Figure 1:
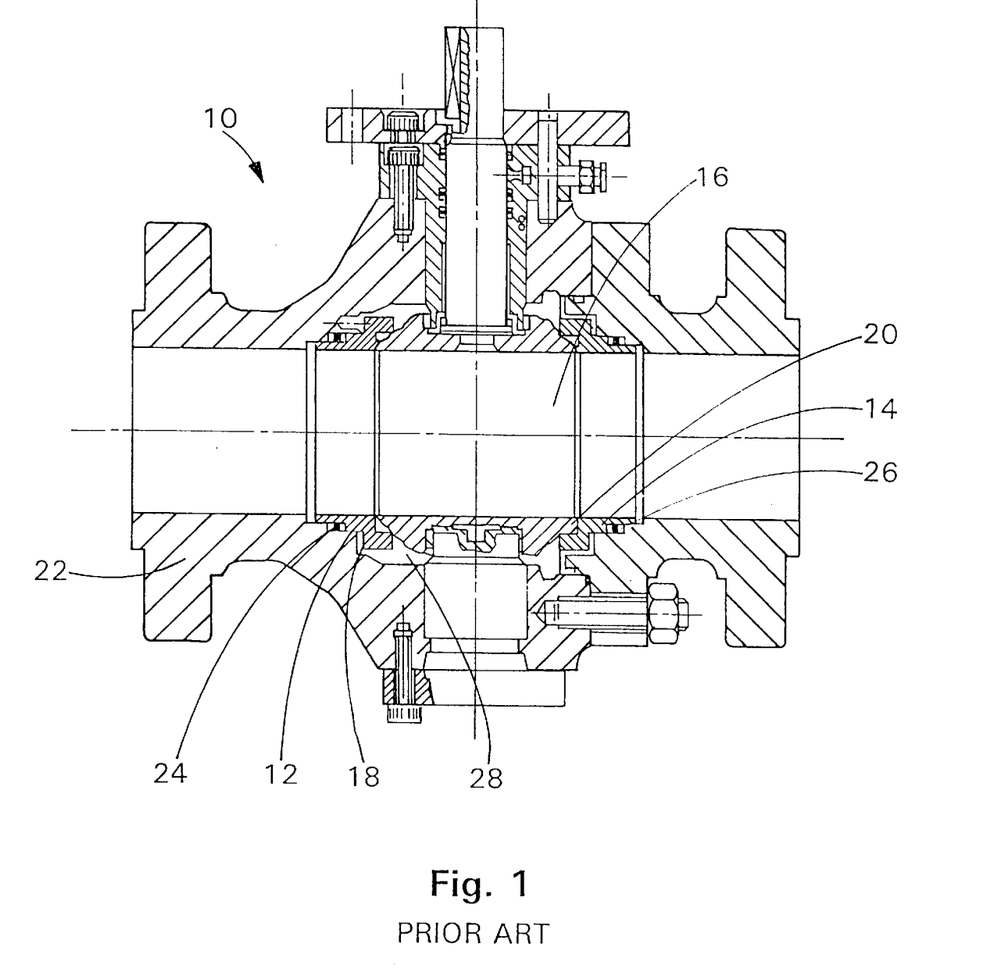
FIG. 1 is a cross sectional elevational view of a ball-type emergency shutdown valve (mostly commonly used on off-shore petroleum and gas platforms), shown in the open position to allow fluid flow.

FIG. 1 is a cross sectional elevational view of the type of valve 10 used in most ESD applications, illustrated in the open position. The valve 10 is a ball valve with a spring-loading mechanism on each side (not shown) that pushes the two valve seats 12, 14 up against the ball 16 in a manner well known in the art. The sealing of the valve seats 12, 14 against the ball 16 is accomplished by means of two generally annular elastomeric rings, one ring 18 located in the upstream seat 12, and one ring 20 located in the downstream seat 14. The spring-loading of the seats 12, 14 holds the elastomeric rings 18, 20 tightly against the ball 16, even as these components wear. Because the seats 12, 14 can move, they also have to be sealed against the valve body 22 and this is accomplished with two O-ring seals 24, 26, one for each seat 12, 14.

The generally open space 28 between the valve body 22, and the seats 12, 14 and ball 16, is known as the inner valve cavity. The inner cavity or cavity 28 is generally fluid filled, but is effectively isolated from the fluid stream flowing through the valve 10 by the upstream elastomeric ring 18 and O-ring 24, and by the downstream elastomeric ring 20 and O-ring 26, each in parallel for the purpose of providing such isolation. Thus if any one of the elastomeric rings 20, 22 or O-rings 24, 26 doesn't seal perfectly, the isolation of the cavity 28 is compromised. Also in the closed position of the valve 10 (not shown), the cavity 28 remains isolated from the upstream fluid as long as both the upstream elastomeric ring 18 and the upstream O-ring 24 afford a perfect seal, and remains isolated from the downstream fluid as long as both the downstream elastomeric ring 20 and the downstream O-ring 26 afford a perfect seal.

For the valve 10 to actually be leaky when closed, at least one of the two upstream seals 18, 24 would have to leak and at least one of the two downstream seals 20, 26 would also have to leak to provide a complete leakage path through the cavity 28. Thus, a test that is sensitive to even one leaky seal would be a conservative, yet valuable test. Such is the case for the present practice of pressurized nitrogen injection into the cavity 28. If any one of the seals 18, 20, 24, 26 leaks, the high pressure nitrogen leaks out of the cavity 28 and the pressure reduction of the nitrogen within the cavity 28 is noted. The method and apparatus of the present invention similarly identifies if any one of the seals 18, 20, 24, 26 leaks, but without requiring the additional and costly nitrogen injection procedure. The method and apparatus of the present invention involves obtaining and analyzing test data to determine if a leaky seal is present.

Figure 2:
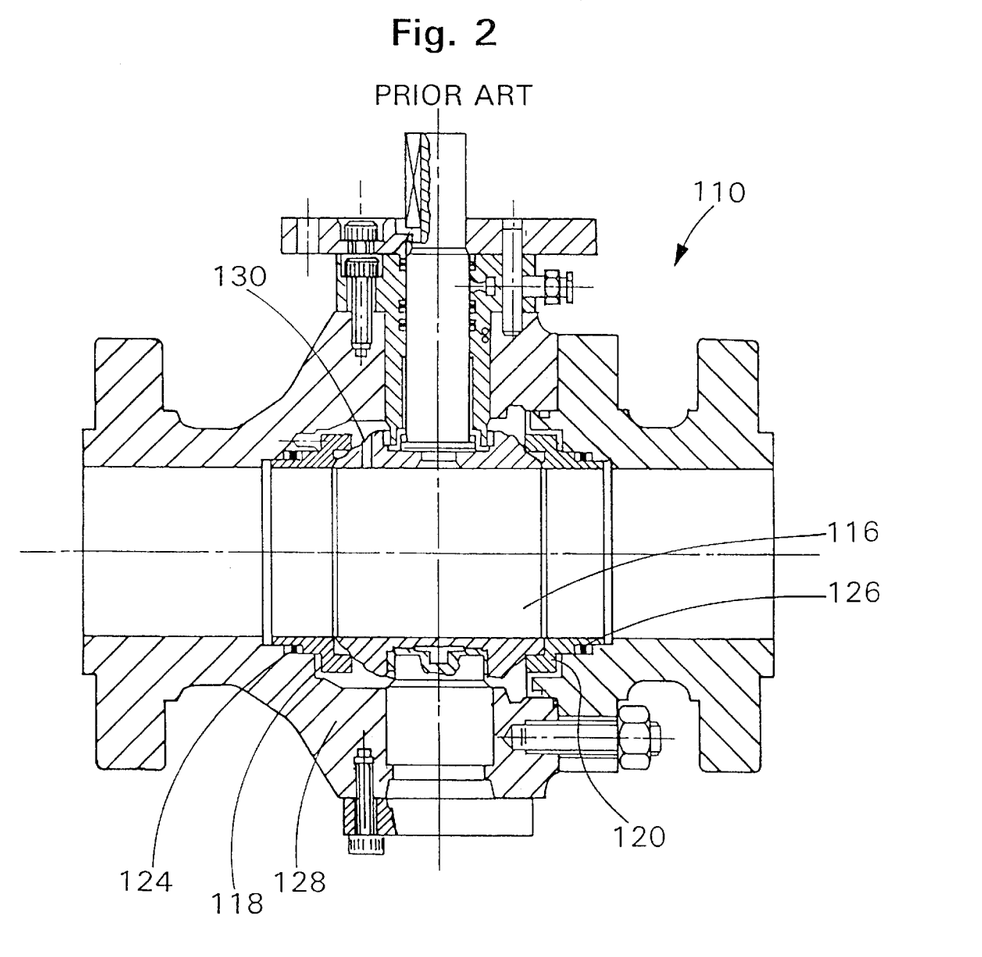
FIG. 2 is a cross sectional elevational view of a less commonly used ball-type emergency shutdown valve, similar to the valve of FIG. 1, but modified to include a bleed hole in the ball to equalize the pressure to the cavity space when the valve is in the open position.

FIG. 2 is a cross sectional elevational view of a ball valve 110 similar to the ball valve 10 of FIG. 1. Close examination, however, reveals a bleed hole 130 in the ball 116 which connects the fluid flow stream through the ball 116 to the cavity 128 while the valve 110 is in the open position as shown. The purpose of the bleed hole 130 is to equalize the pressure between the cavity 128 and the flow stream prior to valve closure. In valves known as double block and bleed valves, if one seat seal leaks, the bleed hole provides additional closing force for the other seat seal. Because the bleed hole 130 itself provides a fluid path between the cavity 128 and the flow stream while the valve is in the open position, the effect of the bleed hole 130 is to obviate the usage of the present invention to test the seals 118, 120, 124, 126 when the valve is in the open position. Ball valves 110 with bleed holes are not as commonly used for ESD applications as are ball valves 10 without bleed holes.

Figure 3:
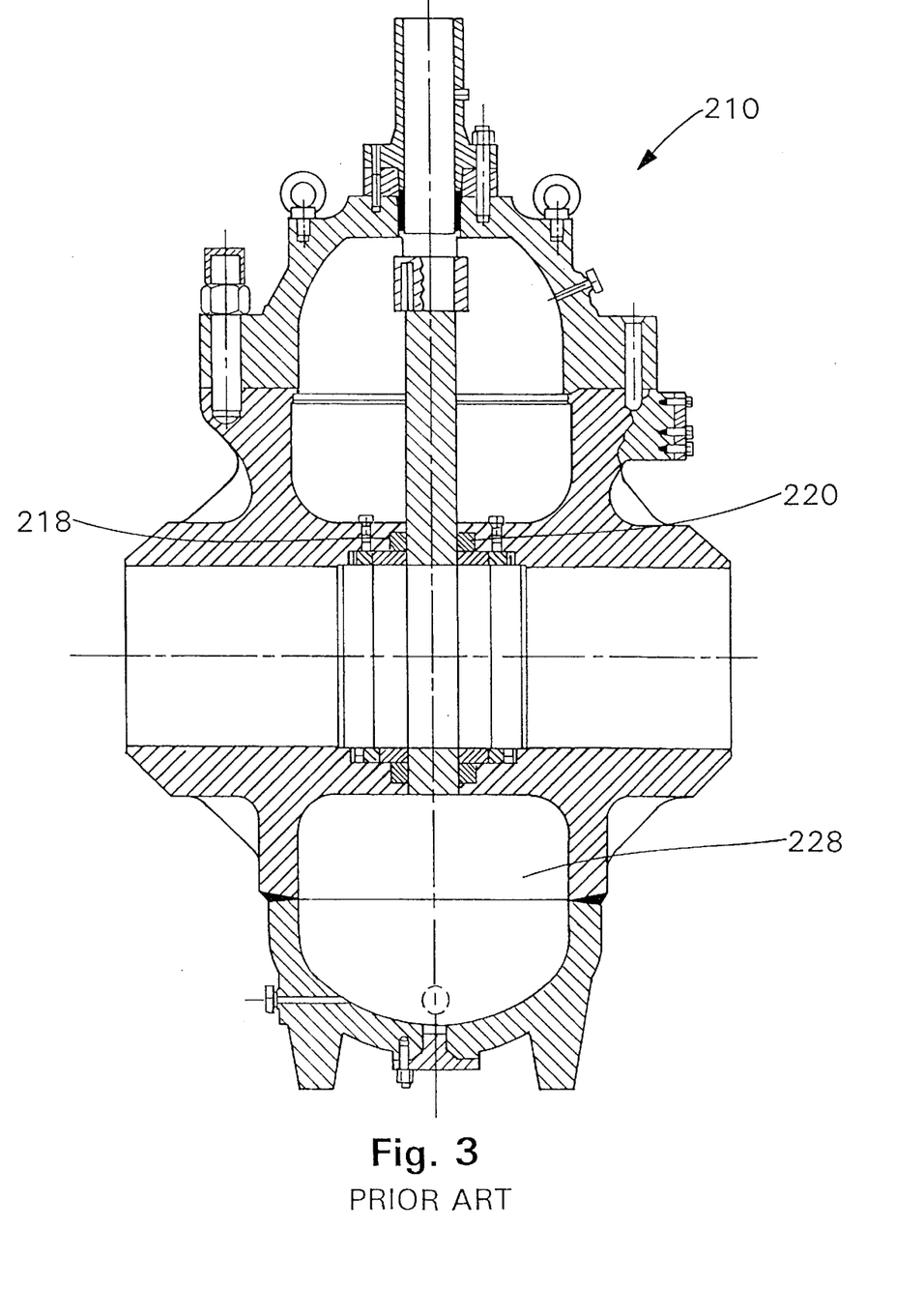
FIG. 3. is a cross sectional elevational view of a gate-type emergency shutdown valve (least commonly used on off-shore petroleum and gas platforms), shown in the open position to allow fluid flow.

FIG. 3 is a cross sectional elevational view of a slide type gate valve 210, illustrated in the open position. While in the open position, the cavity 228 is isolated from the fluid flow stream by the upstream and downstream seals 218, 220. In the closed position (not shown), the upstream seal 218 isolates the cavity 228 from the fluid in the upstream pipe, and the downstream seal 220 isolates the cavity 228 from the fluid in the downstream pipe. This type of valve 210 is used sparingly in ESD applications.

Figure 4:
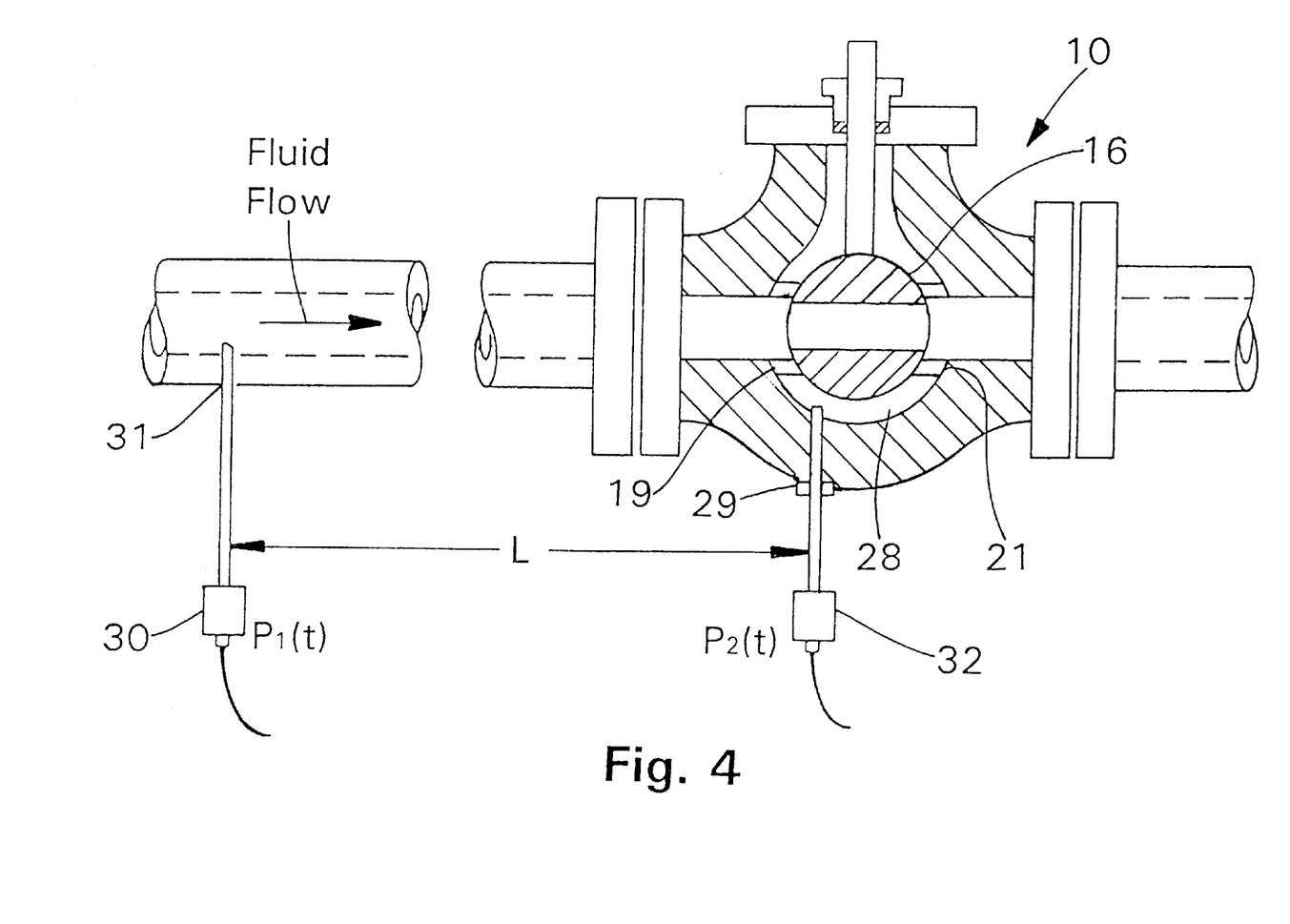
FIG. 4 is a schematic diagrammatic illustration of the valve of FIG. 1 in the open position with a section of upstream pipe and two pressure transducers.

FIG. 4 shows schematically a ball valve 10 without a bleed hole of the type shown in FIG. 1. In FIG. 4, the single illustrated upstream seal 19 represents either of the upstream seals 18, 24 of the actual valve 10 of FIG. 1, and the single illustrated downstream seal 21 represents either of the downstream seals 20, 26 of the actual valve 10 of FIG. 1. The valve 10 in FIG. 4 is illustrated in the open position. Shown are two pressure taps 29, 31, one 29 in the cavity and one 31 upstream of the inner cavity 20 of the valve 10. Note that the upstream tap 31 could be replaced with a downstream tap located downstream of the inner cavity 28 with no change in functionality. The taps 29, 31 are standard taps of a type typically used on oil or gas platform rigs, and the open end of the tap is typically a standard ¼ inch NPT fitting of a type well known in the art and capable of mating with a pressure transducer or pressure transducer adapter to provide fluid communication with the flow stream or inner cavity 28 respectively. It is also useful to have a hand valve installed above the fitting location (not shown) so that transducers may be replaced when the line is filled and pressurized. Also shown are two pressure transducers 30, 32 of a type well known in the art and capable of sensing dynamic pressure and generating representative electrical signals, read p as a function of time, or p(t). Such pressure transducers 30, 32 are of a type well known to those skilled in the art and are often already in position on existing ESD valves. The electrical signal $p_1(t)$ from the first pressure transducer 30 representing the upstream dynamic pressure, and $p_2(t)$ from the second pressure transducer 32 representing the cavity dynamic pressure are input to an analyzer (not shown) that is capable of digitizing and analyzing the simultaneous signals in the frequency domain. The analyzer may be circuitry, software, or a complete commercially available analyzer. One such commercially available analyzer in fairly common use is the Hewlett Packard Model 5423.

When a ball-type ESD valve 10 is fully open and the fluid is flowing through it, if none of the seals 19, 21 are leaky, the fluid in the inner cavity 28 of the valve 10 is effectively isolated from the fluid flowing through the valve 10 and thus from the fluid in the pipe either upstream or downstream from the valve 10. If any of the seals 19, 21 are leaky, however, that isolation of the cavity 28 will be compromised. The greater the degree of leakiness in the seals 19, 21, the greater the degree of compromise of the isolation of the cavity 28.

A leaky seal condition is manifested by a transmission of the dynamic pressure pulsations from the fluid flowing through the valve 10 to the fluid contained in its inner cavity 28. The greater the degree of leakiness, and the lower the frequency of the pulsations, the greater the amount of the transmission of the pulsations into the cavity 28. The amount of transmission can be quantified from the Frequency Response Function (FRF) (sometimes called the transfer function) between the dynamic pressure in the cavity 28 as measured by transducer 32 and the dynamic pressure in the pipe as measured by transducer 30. Two frequency domain representations are useful in this regard. The first representation is the FRF magnitude, indicating the relative energy in the two pressure signals as a function of frequency. The second frequency domain representation is the coherence, indicating the degree of similarity between the two pressure signals as a function of frequency. The second representation is actually a measure of how constant the magnitude and phase relationship is between the two pressure signals as a function of frequency. To see how constant something is, successive traces over time need to be analyzed, and compared. That is accomplished through a process called averaging. Exactly what frequency range the analysis should encompass, and how much averaging is required depends upon the physical situation for a particular valve or application.

The ideal frequency range for analysis is determined in part by the distance L between the pressure transducer 30 and the valve cavity pressure transducer 32 or valve cavity 28. In order not to have to worry about standing wave nodes at certain frequencies, and the effects of multiple acoustic paths, the pressure transducer 30 should be no more than a quarter wavelength from the valve cavity transducer 32. The wavelength is a function of the speed of sound in the fluid and the upper frequency. The relationship is $$\frac{\lambda}{4} = \frac{1}{4} \times \frac{C}{F}$$

where $\lambda$ is the wavelength, C is the speed of sound in the medium and F is the upper frequency. The speed of sound in petroleum at a temperature of 15° C. is 4,367 feet per second. Using that figure for C, and 50 Hz for the upper frequency (F) yields a quarter wavelength of about 22 feet. The speed of sound in natural gas is less than 1,000 feet per second. Keeping 50 Hz as the upper frequency (F) yields a quarter wavelength of about 5 feet. So frequencies up to 50 Hz are clearly acceptable if the upstream or downstream pipe tap is kept to within 22 feet of the valve for oil, and to within 5 feet for gas. If one wishes to increase the usable frequency range, or the pipe tap distances given above, or both, the effect of nodal frequencies and multiple paths can be minimized by using the mean spectral values over the spectral band. The pressure pulsations in the flow stream come about as a result of turbulence in the flow. But occasionally with extremely high flow, highly localized turbulence near one of the sensors can cause pulsations that overshadow the desired more global pulsations, especially at low frequencies. Thus, extending the frequency range of interest up to, or into, the 1,000 Hz region is sometimes desirable, but in no case would it be necessary or desirable to extend it up to, or beyond 10,000 Hz. In any event, the sample rate of each pressure signal, after anti-alias filtering, must be more than twice the maximum frequency. If 50 Hz is to be the maximum frequency, a sample rate of 150 Hz could be used; if 1000 Hz is the maximum frequency, then a 2,500 Hz sample rate is appropriate.

The required duration of each trace record to be used for averaging is determined by the desired frequency resolution. The relationship is inverse. One second yields one Hz resolution, two seconds yields one-half Hz resolution, etc. One Hz resolution should be acceptable in most cases. As indicated previously, averaging of several trace records over time is required to get a meaningful measure of the degree to which the two signals are related and thereby indicating whether, and to what extent the pressure pulsations are passing through at least one of the seals to the inner cavity 28. Typically about 30 averages will suffice. The confidence in the result improves by the square root of the number of averages. So to double the confidence, one needs four times the number of averages. This typically is not a problem for ESD valves without bleed holes that can be tested in the production mode, where virtually unlimited averaging time is available.

However, this is not the case when the test data must be obtained immediately following a shutdown. In a shutdown situation, the data acquisition time may be limited to less than a minute because after that, the transient energy in the pipe might effectively dissipate. ESD ball type valves such as valve 110 with bleed holes in the ball cannot be tested in the production mode and can only be tested in a shutdown mode. This presents a limit to the number of averages, which at one second per record seems like 60 averages for 60 seconds of data, or 30 averages for 30 seconds of data, etc. But overlap processing can be used to improve that situation, so at even with one second per record, 120 averages can be achieved for 60 seconds of data, and 60 averages can be achieved for 30 seconds of data, etc.

Figure 5:
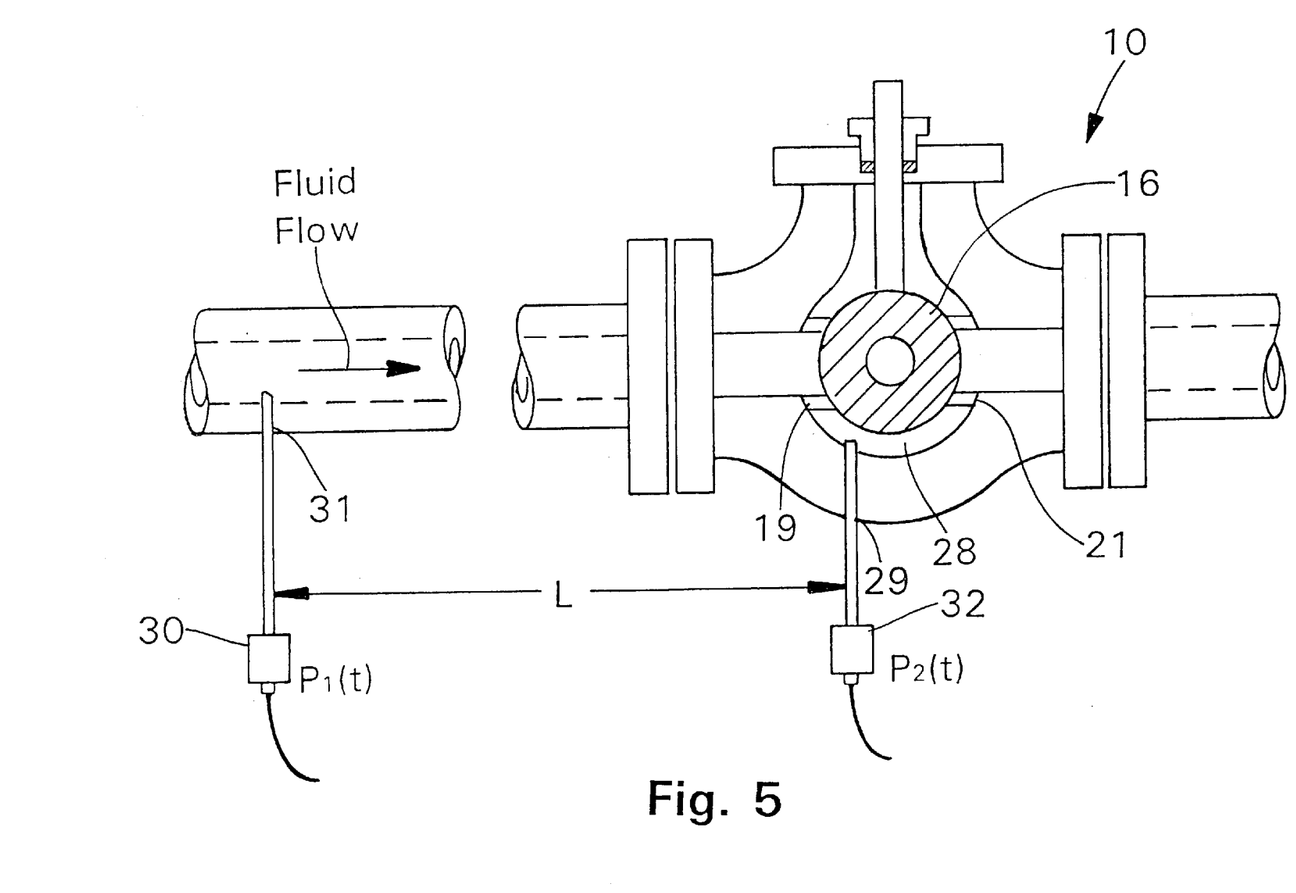
FIG. 5 is a schematic diagrammatic illustration of the valve, pipe, and pressure transducer arrangement of FIG. 4, but with the valve in the closed position.

FIG. 5 shows schematically a ball valve 10 following closure. FIG. 5 represents not only a ball valve 10 without a bleed hole as does FIG. 4, but also represents a ball valve 110 with a bleed hole. That is because when the valve 10 is in the closed position, the bleed hole no longer provides a pathway from the pipe to the internal cavity 28, and so only the seals 19, 21, if leaky, provide such a pathway. Thus, this is the same situation that exists for ball valves without bleed holes in the open position. Where those valves without bleed holes can be tested in the preferred open position production situation, those with bleed holes can only be tested right after being placed in the closed position. In both situations, dynamic energy is required to exist in the pipe. This will always be the case for oil or a mixture of oil and gas, for valves in the open position, production situation, but in the closed position following a shutdown, such dynamic energy may only exist for a minute or less while all the various fluid motions (not just the flow) and pressure fluctuations come to rest following closure. Thus the time limits previously discussed.

Figure 6A:
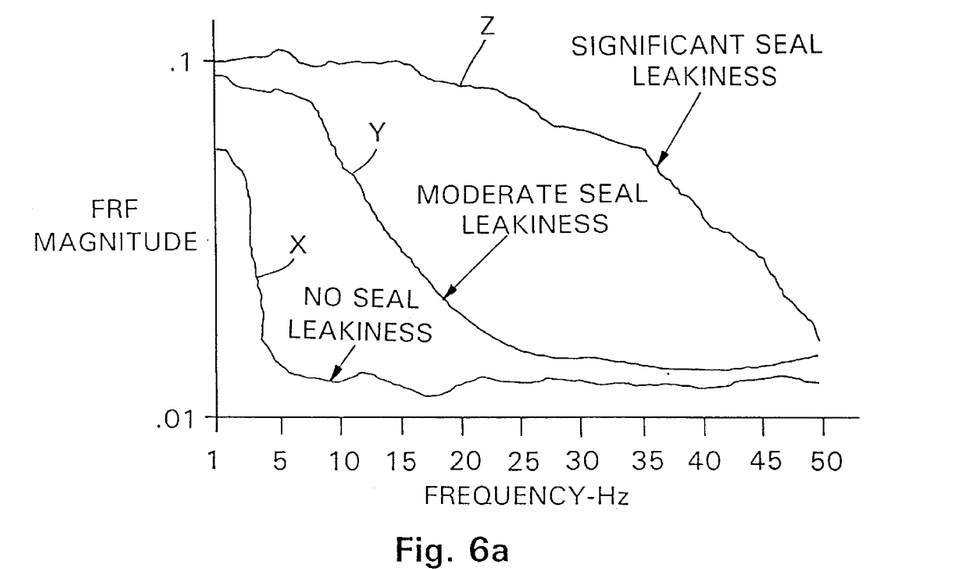
FIG. 6a is a plot of the magnitude representation of the Frequency Response Function (FRF) of the output of the two transducers of FIG. 4 as a function of frequency, over the range from I to 50 Hertz for various degrees of seal leakiness.
Figure 6B:
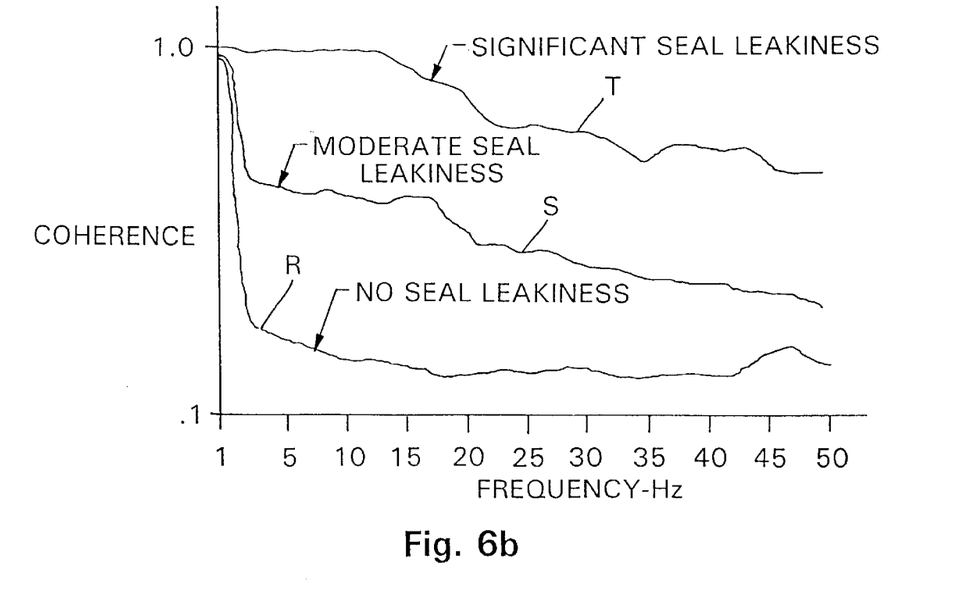
FIG. 6b is a plot of the coherence as a function of frequency from I to 50 Hertz for various degrees of seal leakiness.

FIGS. 6a and 6b show the resulting averaged Frequency Response Function (FRF) magnitude and the coherence function for various degrees of leakiness. The curves (X, Y, Z, R, S, T) represent the analyzed results for data obtained in either mode, either the production mode for ball type ESD valves 10 without bleed holes and ESD gate valves 210, or immediately following shutdown mode for any of the types of ESD valves 10, 110, 210.

FIG. 6a shows different magnitude representations of the FRF, $P_2(f)/P_1(f)$ for different seal leakiness conditions. Here, $P_1(f)$ and $P_2(f)$ are the complex frequency domain representations of $p_1(t)$ and $p_2(t)$ respectively. For a valve with no leaky seals (curve X), the magnitude of the FRF is seen to start out fairly high at very low frequency, but then it plummets to a very low value and stays there at higher frequencies. The fairly high value at very low frequency is due to the very low frequency motions of the platform and the pipe and valve assembly which cause similar, but not equal, low frequency pressure fluctuations in both the upstream pipe and the valve cavity. It has nothing to do with a leaky seal. For a valve whose seal leakiness is significant (curve Z), the magnitude of the FRF starts out a little higher at very low frequency, and then stays high, only gradually failing off with increasing frequency. For a valve with moderate seal leakiness (curve Y), the magnitude of the FRF just above the very low frequency approximates more the curve of the large leak case (curve Z), but then as the frequency increases further it rapidly decreases to better approximate the curve of the no leak case (curve X). Above the quarter wavelength frequency, the magnitude will be seen to vary up and down as the nodal frequencies and multiple paths manifest their effect. Nevertheless, the mean value over the spectrum of curve Z should still exceed that of curve Y, which should in turn still exceed that of curve X.

FIG. 6b shows different coherence representations, $P_2(f)/P_1(f)$ for the same three seal leakiness conditions. Unlike the magnitude representation of the FRF (FIG. 6a) where the highest value could be anything, in the coherence representation, the highest value is always 1.0 indicating perfect coherence. This enhancement in numerical meaning it makes the interpretation of the resulting curves much more definitive. Even for a valve with no leaky seals (curve R), the coherence at just above zero Hz may be at or close to one. This is because the upstream and cavity pressure fluctuations at very low frequency have essentially the same cause—that is the low frequency motions of the platform and pipe run. It doesn't matter if the pressure fluctuations are of different amplitudes, if the cause is the same, the coherence will be nearly 1.0. But for a valve with no leaky seals, the coherence plummets above the very low frequency region. This is because in the higher frequency region, the pressure fluctuation source in the pipe is the flow noise, and this noise is effectively blocked by the seals as it tries to enter the internal cavity. When not testing in production but rather just after a shutdown, the source of the noise is not flow but transients such as sloshing and the like, which arise from the sudden momentum change. For a valve with moderate seal leakiness (curve S), the flow noise or sloshing noise gets through to some degree, especially at the lower frequencies, and this is manifested by a coherence value above 0.5 at low frequency, probably dipping to below 0.5 at higher frequencies. And finally for a valve that has significant seal leakiness (curve T), even more noise gets through to the inner cavity 28, and the coherence although it still dips with increasing frequency, may remain above 0.5 throughout the indicated frequency range. As with the FPF magnitude representation, the coherence representation, above the quarter wavelength frequency, will be seen to vary up and down as the nodal frequencies and multiple paths manifest their effects. But as before, the mean value over the spectrum of curve T should still exceed that of curve S, which in turn should still exceed that of curve R.

Using both the magnitude representation of the FRF, and the coherence, is sure to be more definitive than using either alone. For example, above the very low frequency peak, high magnitudes that are not accompanied by a corresponding reasonable coherence value, will have no seal leakiness significance. Other representations of the FRF, such as the phase representation (not shown), and the real and imaginary representations (not shown), may have some interpretive value as might the auto spectra of each of the two signals (also not shown). All these representations as a function of frequency could be available for inspection following the averaged FRF analysis of the data.

Seal leakiness as mentioned above refers to the leakiness of any of the upstream or downstream seals (18, 20, 24, 26 in FIG. 1). Recall that for the valve 10 itself to be leaky, at least one upstream seal and at least one downstream seal must leak. As a result, the present invention is a very conservative test for valve leakiness. It will effectively catch most problems in the early one-seal-leak stage before it becomes a dangerous two-seal-leak situation. And because of its conservative nature, it will find a use as an adjunct to local leak rate testing (LLRT) in nuclear power plants and in many other valve applications, with or without modification.

There are times when no sound energy exists in the fluid in the pipe, for example during periods of non-production when no fluid is flowing, or well after a production shutdown when the transient energy has already dissipated in the pipeline. In either case, the Frequency Response Function magnitude and the coherence methodology, previously discussed, may still be used if an external sound source is introduced to provide the necessary sonic energy to the fluid.

The sound source could be of any type known to those skilled in the art, for example a piezoelectric transducer. On an oil or gas rig, it may actually be preferable to use a hydraulically-actuated or pneumatically-actuated sound source in order to eliminate any potential explosion hazard, and to more efficiently couple low frequency energy into the fluid.

Figure 7:
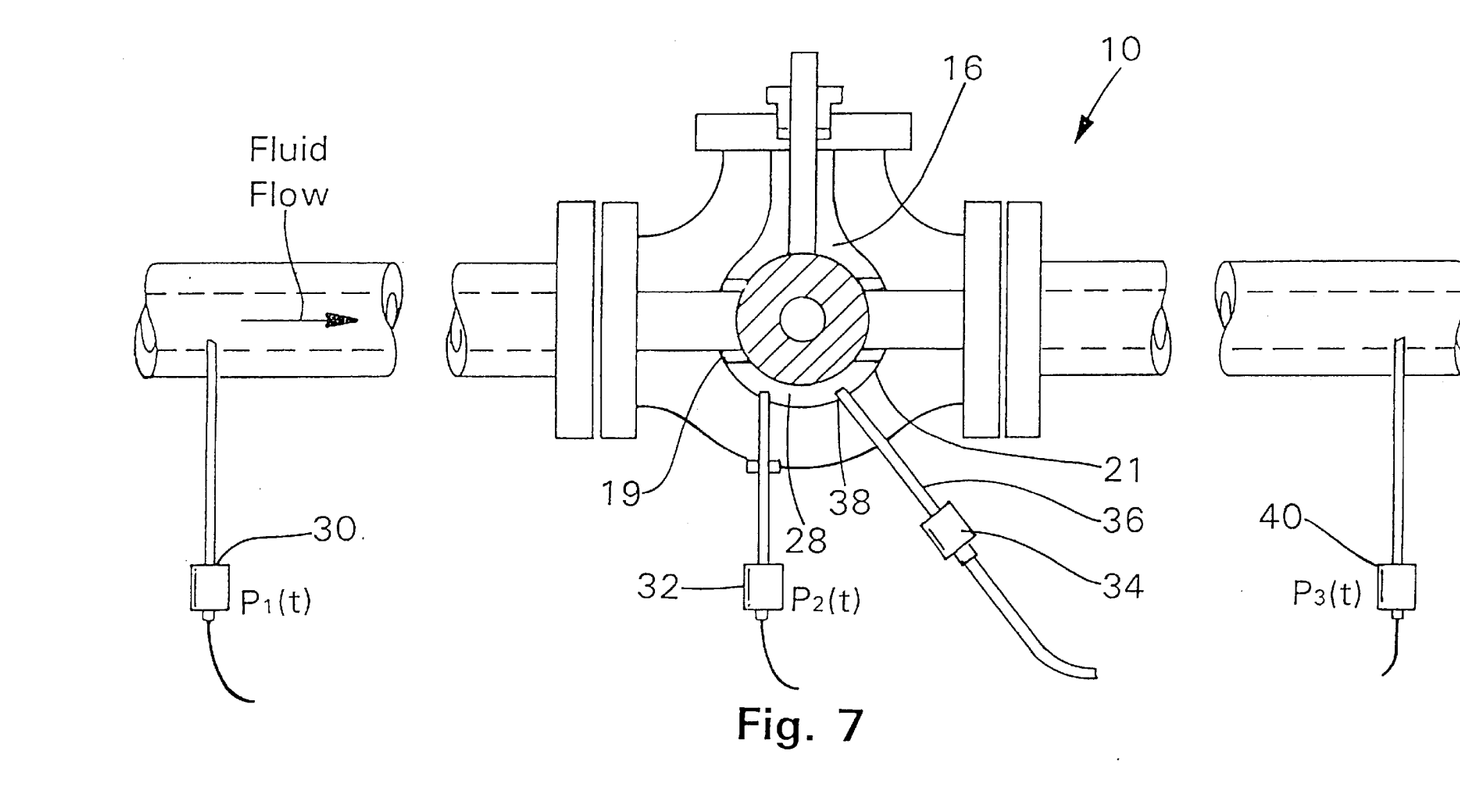
FIG. 7 is a view similar to FIG. 5 showing an alternate embodiment of the invention.

FIG. 7 shows the preferred location and arrangement of an external sound source 34. As seen, the sound source 34 is connected to or otherwise in fluid communication with the inner cavity 28 by a small pipe section 36 extending through a port 38 in the cavity 28 in a manner similar to the manner in which connecting pipe sections are employed for providing fluid communication with the dynamic pressure transducers 30 and 32. The pipe section 36 to the sound source 34 is filled with the working fluid, either oil or gas. As an alternative, if a second inner cavity port 38 is not available, the sound source 34 may be connected into the line to the inner cavity pressure transducer 32 utilizing a "T" connection or the like. A third pressure transducer 40 ($P_3(t)$) is located downstream from the inner cavity 28 of the valve 10. With the valve 10 as shown in the closed position, the only way that sound from the sound source 34 can get to the upstream pressure transducer 30 is for an upstream seal 19 to be leaky, and the only way that sound from the sound source 32 can get to the downstream pressure transducer 40 is for a downstream seal 21 to be leaky. The sound from the source 32 inside the inner cavity 28 of course will be present regardless of whether there are upstream or downstream seal leaks. Connecting the sound source 34 to the inner cavity 28 enables a leak in an upstream seal 19 to be detected in the closed-off position, if an upstream pressure transducer 30 is installed. It also enables a leak in a downstream seal 21 to be detected in the closed-off position, if a downstream pressure transducer 40 is installed. And if both an upstream pressure transducer 30 and a downstream pressure transducer 40 are installed, leaks in both upstream and downstream seals 19, 21 can be detected, and furthermore, they can be differentiated, one from another. The methodology used in the present embodiment is exactly as described above, except now the FRF is formed as $P_1(f)/P_2(f)$ for detecting an upstream seal leak, and as $P_3(f)/P_2(f)$ for detecting a downstream seal leak.

Unlike the situations described above where the sound was broadband as a result of fluid flow noise and transient excitation, in the present embodiment, the utilized sound from the sound source 34 may be sinusoidal. But as before, the upstream and downstream pressure transducers 30, 40 are preferentially placed within a quarter wavelength of the valve 10, for the frequency of the sound source 34 which is employed. With no flow, there is no possibility of highly localized turbulence near one of the sensors, and thus no need to extend the frequency range. At a sound source frequency of 50 Hz, the distance translates to about 22 feet for oil and about 5 feet for gas. If necessary to extend that distance, due to a physical limitation, a sound source frequency of 10 Hz will extend the distance for gas, to over 20 feet. The lowered sound source frequency limit is acceptable for gas, because very low frequency sloshing noise that might otherwise exist for a liquid (such as oil) due to very low frequency platform motions, won't exist for gas.

As discussed above, a high coherence value and high value of the FRF magnitude signals a leaky seal, except that with the present embodiment which uses a sinusoidal sound source 34, the measurement is viewed only at that single sound source frequency to make the determination. With no fluid flow, that single sound source frequency predominates over the surrounding values, in the coherence measurement, and even in the FRF magnitude, because the background sound or noise is small relative to the sound from the sound source 34. The surrounding magnitude values may appear larger than the sound source single frequency component, but only as a result of the inner cavity background sounds being smaller than the upstream and downstream background sounds.

An alternative to a single frequency (sinusoidal) sound source is a repetitive sound pulse or click, the click repetition rate showing up as the fundamental sinusoidal frequency of the sound source, furthermore including all of the harmonics of that fundamental sinusoidal frequency. For example, if there are ten clicks every second, the fundamental frequency component present is 10 Hz, but harmonic frequency components at 20 Hz, 30 Hz, 40 Hz, and 50 Hz, within the 0 to 50 Hz range will also be present.

Figure 8A:
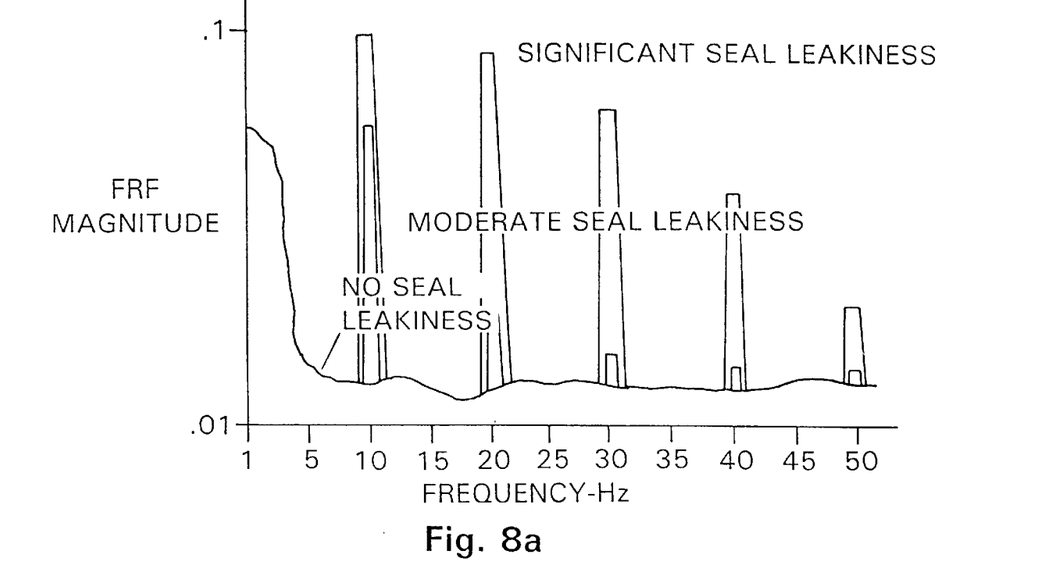
FIGS. 8a and 8b are plots similar to those of FIGS. 6a and 6b made in conjunction with the embodiment of FIG. 7.
Figure 8B:
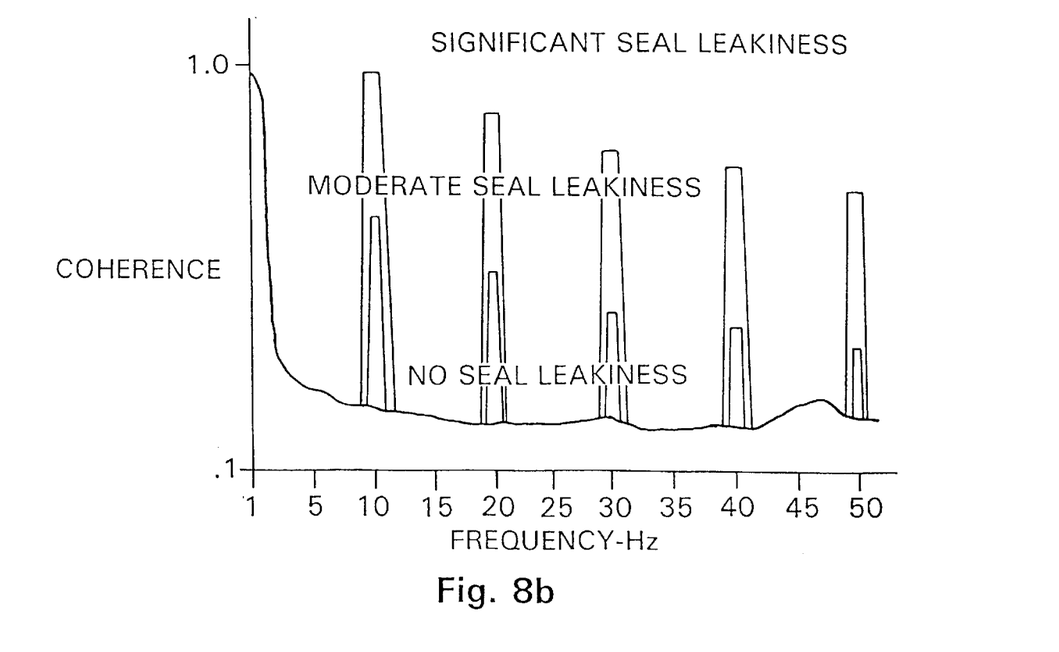

FIG. 8a and 8b show the resulting averaged, 0 to 50 Hz., Frequency Response Function, (either $P_1(f)/P_2(f)$ or $P_3(f)/P_2(f)$) for various degrees of seal leakiness, using a sound source with a repetitive click at 10 Hz. The curves represent the analyzed results for data obtained with the valve 10 closed off as shown in FIG. 7, for any of the types of ESD valves. As a result, there is information at 10 Hz, at 20 Hz, at 30 Hz, at 40 Hz, and at 50 Hz. Less averaging time would be required if a sinusoidal sound source were used instead of a repetitive click because all of the energy would go into the single frequency component, but the seal leakiness information would only exist at that single frequency component. Thus, the use of a repetitive click instead of a sinusoid provides more diagnostic information. This is especially helpful in quantifying the size of the seal leak, as larger size leaks tend to allow more of the higher frequency sound through, while smaller leaks tend to block the higher frequency sound. The previous discussion about the magnitude representation of the FRF and the associated coherence representation still applies, but now the pertinent information exists only at the discreet frequency components.

Although the sound-source approach described herein could be used when there is significant broadband acoustic energy in the line (as in the previously discussed cases), to use it in those cases would not be efficient because it might take an enormous amount of averaging (even synchronous averaging) to be able to "see" or detect the discreet components over the noise. In those previous cases, the flow noise, itself, is the sound source.

In the present embodiment, the sound source 34 is preferably located in fluid communication with the inner cavity 28. But by reciprocity, the same information can be obtained by locating the sound source either upstream or downstream of the valve cavity 28 near the upstream or downstream pressure transducers 30, 40 and using the cavity pressure transducer 32 as a sound detector. This approach is acceptable when there is only an upstream or a downstream pressure transducer, but if both transducers are present, only the inner cavity location allows an upstream or downstream seal leak to be detected using a single sound source 34.

A through leak can be further verified in the valve closed position if a known or determinable differential pressure exists across the closed valve. In that case, fluid will only flow from the high pressure side to the low pressure side through upstream and downstream seal leaks, and in the process, the flowing fluid makes a noise. The noise can be picked up by the internal cavity pressure transducer 32 already in place, and the resulting auto-spectrum (magnitude at a function of frequency) can be obtained through the existing analysis circuitry, and evaluated. If both seals aren't leaking, there is no through leak, and even in the case of a massive upstream or downstream seal leak, there will be no fluid flow and no noise. As a result, a very low valued auto-spectrum will be obtained, with a characteristic 1/f shape. But if a through leak exists, the noise generated in the low frequency range will increase the spectral floor. The greater the leak and the greater the differential pressure, the greater the increase. The effect is particularly apparent near cavity natural frequencies which are typically less than a few hundred Hz. If the differential pressure is known or repeatable, an approximate quantification of the through leak may be feasible. This method differs from an acoustics emission approach, where the frequencies considered are much higher, usually well above 10 KHz.

But the approach above is not universally applicable since differential pressure is not always present, and even when it is, the differential pressure level may not be known. By contrast, the sound source approach described previously is universally applicable for the closed valve situation, since it doesn't depend on sound energy from somewhere else. And like the open valve situation, this approach is independent of sound level since the FRF magnitude and the coherence representations are automatically normalized. That provides repeatable approximate leak quantification, possibly even as a single number answer using the mean value over the spectrum discussed previously. The ability to approximately quantify leaky seals and through valve leaks is important since certain leaks may be deemed acceptable if they are judged to not exceed the capacity of the on-board fire protection system.

The only trade-off in employing the sound source 34 to the inner cavity 28 occurs when either the upstream pressure transducer 30 or the downstream pressure transducer 40 isn't utilized. This situation will sometimes occur for riser (sea side) ESD valves where the use of an upstream tap 31 may be frowned upon as a potential separate leak source, and for export (to shore) ESD valves where the use of a downstream tap may be similarly frowned upon.

Figure 9A:
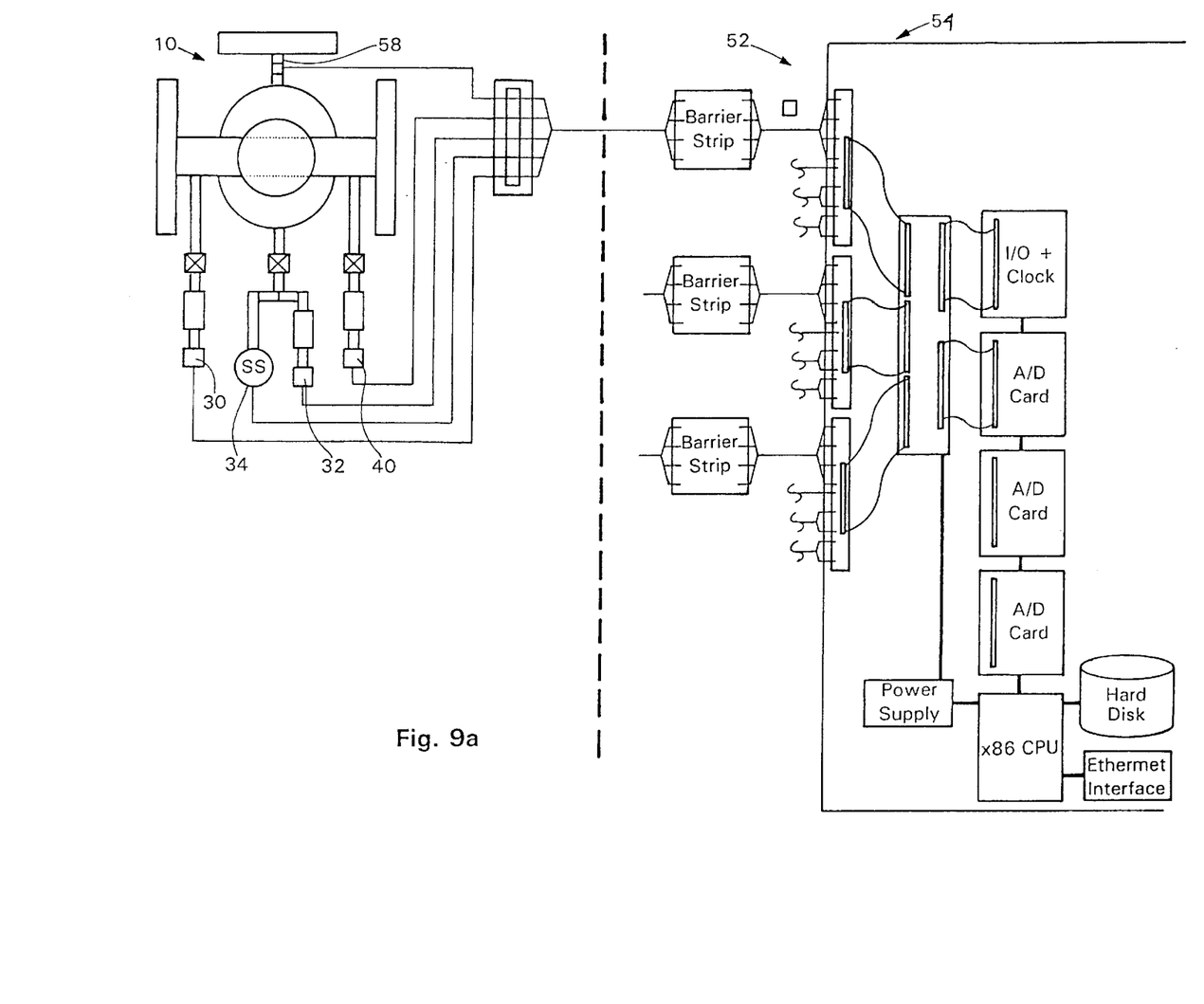
FIGS. 9a and 9b are schematic block diagrams of an on-line system utilizing the present invention.
Figure 9B:
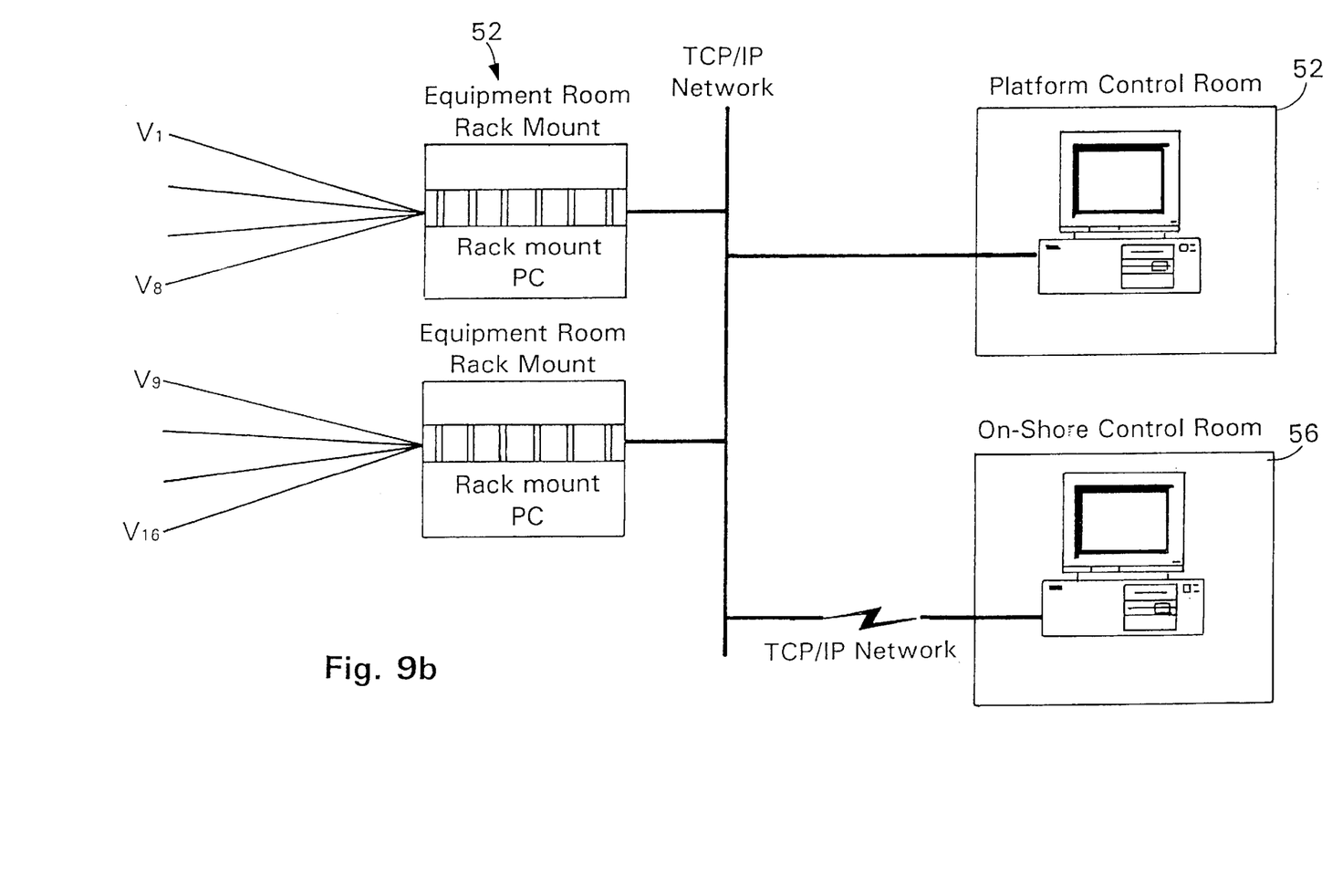

FIG. 9a and 9b show an on-line system approach for the present invention with the sensors and sound source located on or near the valve 10, and with data acquisition circuitry and analysis circuitry 52 located in a nearby (safe) equipment room 54. More than one equipment room 54 may be used on a platform, and several valves may connect to the circuitry 52 in each equipment room. An on-shore control room computer or server 56 may be connected by radio link. Engineers at various locations may connect to the server 56 to obtain the relevant data. A portable version of the system (not shown), using the same sensors and possibly the sound source is of course also feasible.

The illustrated on-line version acquires production (open valve) data periodically, sampling each signal at 1,000 samples per second, forming and averaging the FRF magnitude and coherence functions and analyzing the results. It also automatically triggers on the breakaway torque or thrust signal from a torque or thrust sensor 58, and uses changes in that signal, including the pretrigger portion, to assess valve degradation. On oil platforms, immediately at the end of that trace (signaling valve closed in the closing stroke), pressure data may be acquired by the various transducers 30, 32, 40 using residual fluid noise in the pipe for a short period of time. The system may also be used to acquire inner cavity auto-spectrum data in closed valve situations where known differential pressure exists across the valve 10. And finally, also for closed valve situations, the sound source is activated and data is acquired from the pressure transducers 30, 32, 40 and the signals are analyzed and evaluated using the FRF magnitude and coherence functions as above.

It will be appreciated by those skilled in the art that changes or modifications could be made to the above described embodiment without departing from the broad inventive concepts of the invention. It should be appreciated, therefore, that the present invention is not limited to the particular embodiment disclosed but is intended to cover all embodiments within the scope or spirit of the described invention.

We claim:

1. A method for use with a fluid transport system having an upstream pipe, a downstream pipe and a valve connected between the upstream pipe and the downstream pipe for controlling fluid flow through the system, the valve having at least one upstream seal, at least one downstream seal and an inner cavity effectively isolated by the seals from the fluid flow stream, the method for detecting the presence of a leak in both of the seals when the valve is closed and a differential pressure exists across the valve, comprising the steps of:

determining the magnitude of the differential pressure across the valve;

sensing the presence of pressure pulsations within the inner cavity resulting from fluid flowing through the seals into and out of the inner cavity and generating representative electrical signals as a function of time;

analyzing the electrical signals and generating an auto spectrum representation; and using the auto spectrum in conjunction with the determined differential pressure magnitude to indicate the existence and extent of a leak.

2. The method of claim 1 and wherein the step of sensing the presence of pressure pulsations comprises detecting noise resulting from fluid flowing through the valve.

3. The method of claim 2 and further comprising placing a pressure transducer within the inner cavity of the valve to detect noise from the fluid flowing through the valve.

4. The method of claim 1 and further comprising quantifying the amount of leakage of fluid through the valve seals.

5. The method of claim 1 and wherein the step of sensing the presence of pressure pulsation comprises positioning a pressure transducer within the inner cavity of the valve and detecting noise resulting from fluid flowing through the valve seals and the closed valve.

6. The method of claim 1 and wherein using the auto-spectrum in conjunction with the determined differential pressure magnitude to indicate the existence and extent of a leak of fluid flowing through the closed valve comprises measuring noise generated in a low frequency range resuloting from a leak to develop the auto-spectrum representative of the measured noise, and monitoring increases of the differential pressure to determine an approximate quantification of the leak.

7. A method of detecting leaks in a valve of the type used in a fluid transport system and having at least one upstream seal, at least one downstream seal and an internal cavity between the seals and through which a fluid flow is passed, when the valve is in a closed condition, comprising:

determining a differential pressure across the valve;

monitoring noise resulting from fluid flowing through the seals into and out of the internal cavity with at least one pressure transducer;

determining a resulting auto-spectrum of the monitored noise as a function of frequency; and     determining the existence and extent of a leak through the seals of the valve based upon the determined differential pressure and auto- spectrum.

8. The method of claim 7 and further comprising placing a pressure transducer within the inner cavity of the valve to detect noise from the fluid.

9. The method of claim 7 and further comprising monitoring the noise of the fluid flowing through the closed valve in a low frequency range.

10. The method of claim 7 and wherein monitoring noise resulting from the fluid flowing through the seals comprises sensing pressure pulsations within the internal cavity from the fluid passing through the valve internal cavity and sending electrical signals representative of such pressure pulsations to analyzing circuitry.

\* \* \* \* \*